W. G. QUARLES & C. H. STURGILL.
NUT LOCK.
APPLICATION FILED JUNE 21, 1917. RENEWED JUNE 21, 1918.
1,287,431. Patented Dec. 10, 1918.
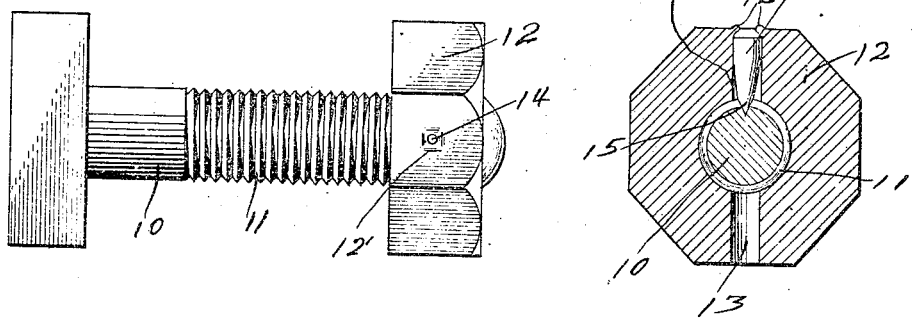
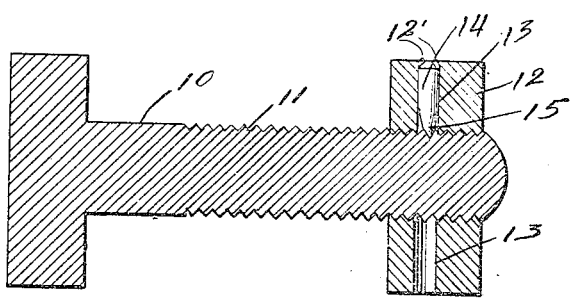
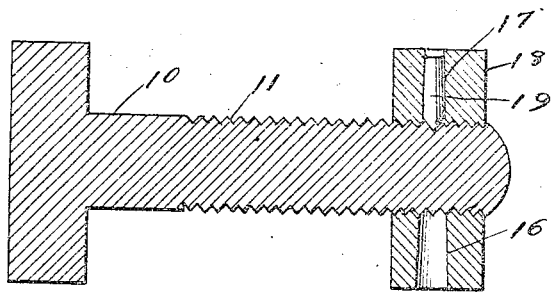
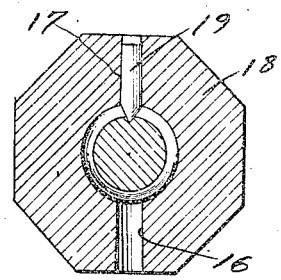
Inventor
W. G. Quarles & C. H. Sturgill

UNITED STATES PATENT OFFICE.

WILLIAM G. QUARLES AND CHARLIE H. STURGILL, OF EAST CHATTANOOGA, TENNESSEE.

NUT-LOCK.

1,287,431.  Specification of Letters Patent.  Patented Dec. 10, 1918.

Application filed June 21, 1917, Serial No. 176,184. Renewed June 21, 1918. Serial No. 241,296.

*To all whom it may concern:*

Be it known that we, WILLIAM G. QUARLES and CHARLIE H. STURGILL, citizens of the United States, residing at East Chattanooga, in the county of Hamilton, State of Tennessee, have invented certain new and useful Improvements in Nut-Locks; and we do hereby declare the following to be a full, clear, and exact description of the invention, such as will enable others skilled in the art to which it appertains to make and use the same.

This invention relates to new and useful improvements in nut locks.

One object of the present invention is to improve the construction of devices of this character wherein the locking member is positively held from removal or accidental displacement, thus rendering the nut immovable with respect to the bolt in either direction.

Another object is to provide a device of this character which is simple in construction, easy to assemble and which can be manufactured at a comparatively low cost.

Other objects and advantages will be apparent from the following description when taken in connection with the accompanying drawing.

In the drawing:

Figure 1 is an elevation of our improved nut locking device shown in connection with a nut and bolt.

Fig. 2 is a vertical longitudinal sectional view taken centrally through the nut and bolt.

Fig. 3 is a vertical transverse sectional view taken on the line 3—3 of Fig. 1.

Fig. 4 is a sectional view similar to Fig. 2 showing a modified form.

Fig. 5 is a vertical sectional view taken on the line 5—5 of Fig. 4.

Referring to the accompanying drawing, and particularly to Figs. 1, 2, and 3, 10 represents a bolt having the threaded portion 11 on which is engaged the nut 12. Formed through two of the opposite side faces of the nut, and communicating with the central bore of the nut, are the openings 13, said openings being in axial alinement, as shown. A headless metal pin 14 having a point 15 is disposed through either of the openings 13 and then the same driven into the threaded portion of the bolt until the outer end of the pin lies below the face of the nut. The face of the nut, surrounding the opening is then upset at 12' to lie over the opening and thus prevent the removal of the pin accidentally or otherwise. It will be noted that the point of the pin, when driven in will penetrate the threaded portion of the bolt, thereby preventing the relative rotation of the bolt and nut.

Referring particularly to Figs. 4 and 5 there is shown a modified form of the nut lock, wherein the openings 16 and 17 in the opposite sides of the nut 18 are formed by drilling clear through the nut, and across the central threaded bore. It will be noted that the openings are formed on a generally tapering line, so that when the pin 19 is driven into the opening 17 the inner end of the pin will be allowed a space in which to expand, by reason of the fact that the inner end of the said opening is wider than the outer portion. In this form the expanding of the inner end of the pin serves to prevent the outward movement of the pin, after having been properly driven into the bolt.

Thus there has been provided a simple and effective device whereby a nut can be positively locked against turning on the bolt, in either direction.

If desired, the face of the nut, surrounding the opening 17, may be upset in the same manner as the face is treated in the first form, thereby providing a second means for preventing the removal of the pin.

Attention is called to the fact that the invention is capable of ready application of bolts and nuts now in use by simply boring the holes 13 or 16 and 17 through the nut. Thus the ordinary nut is readily converted into a device for use in connection with the present invention, and without any appreciable increase in the cost of the manufacture of the nut. Furthermore, the method now employed in the manufacture of nuts need not be interfered with.

What is claimed is:

In a nut lock device, a bolt, a nut engaged on the bolt, the nut having openings formed transversely therethrough and intersecting the central opening of the nut, said openings being in axial alinement and tapering in the outward direction, and a pointed pin disposed through one of said openings and penetrating into the bolt, the inner end of the pin being upset into the inner wider portion of the opening.

In testimony whereof, we affix our signatures in the presence of two witnesses.

WILLIAM G. QUARLES.
CHARLIE H. STURGILL.

Witnesses:
A. O. MOORE,
IRENE MOORE.